UNITED STATES PATENT OFFICE.

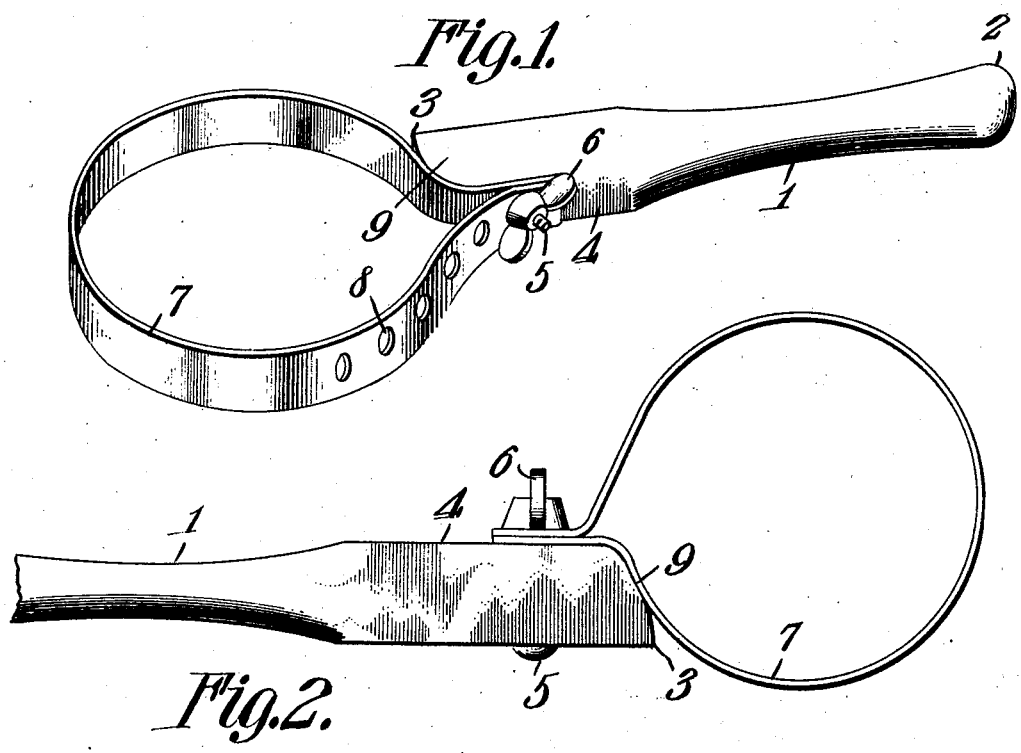
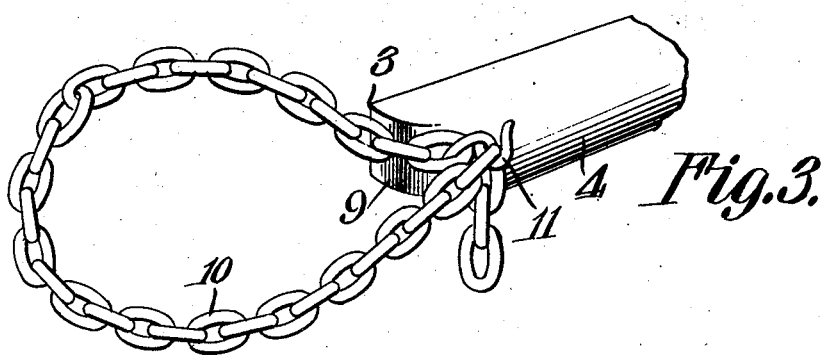

FLORENT IOSET, OF WADENA, MINNESOTA.

PIPE-WRENCH.

No. 896,730.   Specification of Letters Patent.   Patented Aug. 25, 1908.

Application filed February 28, 1908. Serial No. 418,322.

*To all whom it may concern:*

Be it known that I, FLORENT IOSET, a citizen of the United States, residing at Wadena, in the county of Wadena and State of Minnesota, have invented a new and useful Pipe-Wrench, of which the following is a specification.

This invention relates to gripping devices, and more particularly to that type of wrenches adapted to encircle round objects, such as pipes, fruit jar covers, and the like, and has for its object to provide a smooth gripping surface such as will not mutilate or otherwise deface the surface of the object to be turned.

It is well known that with most wrenches used in pipe fitting, the gripping jaws are serrated, and after a pipe has been threaded into an elbow or joint with such a wrench, the marks left on the surface of the pipe render it unsightly. This is especially so with nickel plated pipes used in bathroom fittings.

The present invention aims to remedy this defect by employing a resilient or flexible member having smooth contacting surfaces adapted to encircle a pipe or other round object and either tighten or loosen the same without marking.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of the device equipped for turning pipes and the like. Fig. 2 is a side view of the same. Fig. 3 is a perspective view showing the device equipped for turning heavy steam pipes and the like.

Similar numerals of reference are employed to indicate corresponding parts throughout the several figures of the drawings.

A handle 1 which may be formed from wood, iron, or other suitable material, is provided at one end with a rounded head 2, and an intermediate circular portion adapted to form a smooth grip for the hand of the operator. Adjacent the opposite end 3, and extending forwardly from the circular portion is an approximately rectangular portion, the front face 4 of which is beveled at the end, said beveled end forming a bearing surface 9, the function of which will appear later. The front face 4 is intermediately provided with a perforation extending transversely through the opposite face forming a seat for the screw 5, the threaded end of which extends beyond the face 4, and on this end is threaded a thumb nut 6. A flexible member 7, preferably formed of soft steel or other suitable material, is provided with perforations 8, and one end of this member is secured to the face 4 and provided with a perforation registering with the perforation for a screw 5.

When it is desired to use the device for turning fruit jar covers, small pipes, and the like, the free end of the member is passed around the object to be turned, and the member adjusted to a snug fit. The free end then is brought down and over the face 4 and is secured thereto by the screw 5, entering one of the perforations 8. When the device is now turned by means of the handle, the shoulder 9 will bear against the outer face of the member 7, and as the pressure on the handle increases the member will be forced further over on the shoulder 9. It is obvious that as this is done, the ordinary circle formed by the adjoining ends of the member will be contracted, with consequent increase of friction between the members and object to be turned resulting in loosening or tightening the latter, as the case may be.

In the modification shown in Fig. 3, a chain 10 is used instead of the band 7, and this form of the device is intended for use with large steam pipes and the like. Instead of the screw 5 and nut 6, in this case there is employed a hook 11. The device is adjusted and operated similarly to the form shown in Figs. 1 and 2.

The advantages of the present construction are easily seen when compared with most devices of this type now in use, in which a large number of parts are employed which are more or less apt to get out of order or broken. The present device is comparatively inexpensive to manufacture, reduces the number of parts to the minimum, and at the same time presents a device adapted for use on the lightest and heaviest forms of pipe.

What is claimed is:—

1. A gripping device embodying a handle having opposite faces, one of said faces terminating in a beveled surface at one end of the handle, a member provided with openings, and a means adapted to pass through the openings and serving to secure the member on one face of the handle so as to bring the one face of the member to bear on the beveled surface.

2. A gripping device embodying a handle provided with an opening and having opposite flat faces, one of said faces terminating in a beveled surface at one end of the handle, a flexible member having a plurality of openings adapted to be brought to register with the opening of the handle, and a member adapted to enter the said openings and serving to secure the flexible member on one face of the handle so as to bring the one face of the member to bear on the beveled surface.

In testimony that I claim the foregoing as my own, I have hereto affixed my signature in the presence of two witnesses.

FLORENT IOSET.

Witnesses:
   ARTHUR C. MURRAY,
   JESSE W. ALDRICH.